3,632,611
Patented Jan. 4, 1972

3,632,611
ANTHRAQUINONE DYES CONTAINING A REACTIVE CARBAMYLMETHYL GROUP
Hirohito Kenmochi, Toyonaka-shi, Seiji Hotta, Minoo-shi, and Takashi Akamatsu, Ashiya-shi, Japan, assignors to Sumitomo Chemical Company, Ltd., Osaka, Japan
No Drawing. Filed Oct. 9, 1967, Ser. No. 673,981
Claims priority, application Japan, Oct. 12, 1966, 41/67,325; Oct. 14, 1966, 41/67,670; Oct. 18, 1966, 41/68,751; Nov. 11, 1966, 41/74,331; Feb. 10, 1967, 42/8,689; Feb. 13, 1967, 42/9,379; May 16, 1967, 42/31,388
Int. Cl. C09b 62/70, 62/72; D06p 1/38
U.S. Cl. 260—372                                 9 Claims

ABSTRACT OF THE DISCLOSURE

A reactive dye having a carbamylmethyl as a reactive group and represented by the formula, $$Q-\left[-CH_2NHCO-\left[\underset{(B)_m}{\diagup\!\!\!\diagdown}-A-NH-\right]_n-\underset{(B)_m}{\diagup\!\!\!\diagdown}-SO_2Y\right]_o$$

wherein:
A is $-SO_2-$ or $-CO-$;
B is methyl, methoxy or chlorine;
Y is $\beta$-sulfatoethyl or vinyl;
$m$ and $n$ are 0 or 1;
O is 1 or 2; and
Q is an anthraquinone residue having the formula:

<chemical structure: anthraquinone with R1-R8 substituents> wherein:
$R_1$ is hydroxy, amino or a substituted amino;
$R_2$ and $R_3$ are hydrogen, bromine, methyl, sulfamyl, sulfo, phenoxy or 4-sulfamylphenoxy;
$R_4$ is hydroxy, methyl-substituted phenyl, methyl and sulfamyl-substituted phenyl, amino or a substituted amino;
$R_5$ and $R_8$ are hydrogen, hydroxy or sulfo; and
$R_6$ and $R_7$ are hydrogen, chlorine or sulfo, the above substituted aminos being a $C_{1-3}$ alkylamino, ($\alpha$-$C_{1-3}$-alkyl-$\gamma$-phenyl or -4-sulfamylphenyl) propylamino, cyclohexylamino, 2-benzylcyclohexylamino, 1,2,3,4-tetrahydronaphthylamino, or; a substituted phenylamino where the substituent is methyl, ethoxy, sulfamyl, methyl and sulfanyl, N-phenylsulfamyl, sulfo or methyl- or chloro-substituted phenoxy; the carbamylmethyl being attached to the aryl carbon atom of said phenyl group or the nitrogen atom of said sulfamyl group.

The present invention relates to novel reactive dyes having one or more reactive groups represented by the formula $$-CH_2NHC-\left[\underset{(B)_m}{\diagup\!\!\!\diagdown}-A-NH-\right]_n-\underset{(B)_m}{\diagup\!\!\!\diagdown}-SO_2Y$$
$$\parallel$$
$$O$$
(I)

wherein,
A: $-SO_2-$ or $-CO-$,
B: methyl, methoxy group or halogen atom,
Y: $\beta$-sulfatoethyl or vinyl group
$n$: 0 or 1
$m$: 0 or 1 manufacturing process thereof, and the process for dyeing fibers with these dyes.

The present inventors previously found that novel reactive dyes of value can be obtained remarkably easily in an industrial scale with a good yield by introducing into a conventional organic dye a reactive group represented by a formula (V), $$\underset{\underset{R^1}{|}}{-CH_2NCOR^2SO_2Y}$$
(V)

(wherein $R^1$ is a hydrogen atom or an alkyl group of $C_{1-3}$, $R^2$ is an alkylene group of $C_{1-2}$ and Y is a $\beta$-sulfatoethyl group or vinyl group) with a one-step process. As the result of further study, the present invention has been accomplished. The particularly excellent characteristic of the present invention is that the dye can excellently be adhered onto cellulose fiber.

The object of the present invention is to provide novel reactive dyes which are used to dye cellulose fiber. Another object of the present invention is to provide a process for producing the above-mentioned novel preactive dyes. Further, an object of the present invention is to provide a process for dyeing fibers with the above-mentioned novel dyes. Other objects will be made clear from the following text.

The novel reactive dye having at least one reactive group represented by the Formula I is obtained by reacting an organic dye having a hydrogen atom which can be substituted with a reactive compound represented by the general Formula II, $$XCH_2NHCO-\left[\underset{(B)_m}{\diagup\!\!\!\diagdown}-A-NH-\right]_n-\underset{(B)_m}{\diagup\!\!\!\diagdown}-SO_2CH_2CH_2OH$$
(II)

(wherein A, B, $m$ and $n$ are the same as shown in the above, and X is a hydroxy group or halogen atom) in sulfuric acid, or by reacting the dye with a compound represented by the general Formula III or IV, $$NH_2CO-\left[\underset{(B)_m}{\diagup\!\!\!\diagdown}-A-NH-\right]_n-\underset{(B)_m}{\diagup\!\!\!\diagdown}-SO_2CH_2CH_2OH$$
(III)

$$NC-\left[\underset{(B)_m}{\diagup\!\!\!\diagdown}-A-NH-\right]_n-\underset{(B)_m}{\diagup\!\!\!\diagdown}-SO_2CH_2CH_2OH$$
(IV)

(wherein, A, B, $m$ and $n$ are the same as shown in the above) in the presence of formaldehyde in sulfuric acid.

Further, the present invention provides a process for producing a novel reactive compound represented by the Formula II, $$XCH_2NHCO-\left[\underset{(B)_m}{\diagup\!\!\!\diagdown}-A-NH-\right]_n-\underset{(B)_m}{\diagup\!\!\!\diagdown}-SO_2CH_2CH_2OH$$
(II)

wherein:

A: —SO₂— or —CO—
B: methyl group, methoxy group or halogen atom
m: 0 or 1
n: 0 or 1
X: hydroxy or halogen atom by hydrolyzing a compound represented by the general Formula IV,

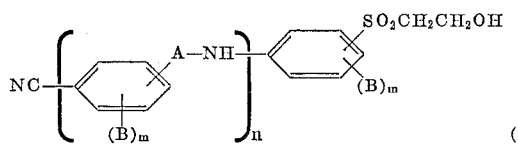

(IV)

with weakly alkaline hydrogen peroxide to obtain a compound represented by the following general formula,

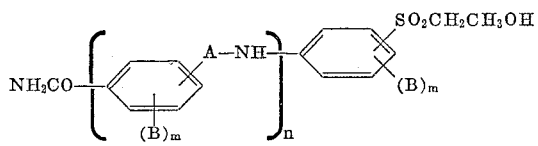

which is subjected to N-methylolation or N-halomethylolation.

Organic dyes to be used in the process of the present invention, include various conventional dyes having substitutable hydrogen atoms such as, for example, anthraquinone dye, mono- or disazo dye, azo dye containing metals, phthalocyanine dye, aminonaphthalimide dye, xanthene dye, etc. The substitutable hydrogen atoms include those on the aryl nucleus and those contained in a sulfonamide group.

As anthraquinone dyes having substitutable hydrogen atoms on the aryl nucleus, conventional acid dyes or dye bodies thereof can be used, and anthraquinone dyes having aryl nucleus with substitutable hydrogen atoms through a bond such as —NH—, —O—, —S—, —NH —alkylene—, etc., can be used. It is preferable that, in this case, the aryl nucleus has a para-orientation radical such as methyl, methoxy group, etc., in addition to substitutable hydrogen atom. And anthraquinone nucleus can be further substituted with a sulfonic acid group, halogen atom, hydroxy group, amino group, acetylamino group, etc.

The anthraquinone dyes of the invention may be represented by the following formula:

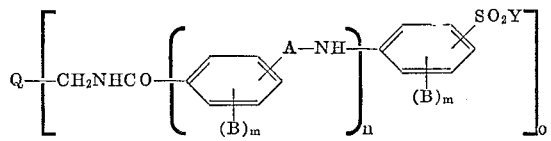

wherein:

A is —SO₂— or —CO—;
B is methyl, methoxy or chlorine;
Y is β-sulfatoethyl or vinyl;
m and n are 0 or 1;
O is 1 or 2; and
Q is an anthraquinone residue having the formula:

$$\begin{array}{c} R_8 \quad O \quad R_1 \\ R_7 \diagup\diagdown R_2 \\ R_6 \diagdown\diagup R_3 \\ R_5 \quad O \quad R_4 \end{array}$$

wherein:

$R_1$ is hydroxy, amino or a substituted amino;
$R_2$ and $R_3$ are hydrogen, bromine, methyl, sulfamyl, sulfo, phenoxy or 4-sulfamylphenoxy;
$R_4$ is hydroxy, methyl-substituted phenyl, methyl and sulf- amyl-substituted phenyl, amino or a substituted amino;
$R_5$ and $R_8$ are hydrogen, hydroxy or sulfo; and
$R_6$ and $R_7$ are hydrogen, chlorine or sulfo, the above substituted aminos being a $C_{1-3}$ alkylamino, (α-$C_{1-3}$-alkyl-γ-phenyl or -4-sulfamylphenyl) propylamino, cyclohexylamino, 2-benzylcyclohexylamino, 1,2,3,4-tetrahydronaphthylamino, or; a substituted phenylamino where the substituent is methyl ethoxy, sulfamyl, methyl and sulfamyl, N-phenylsulfamyl, sulfo or methyl- or chloro-substituted phenoxy; the carbamylmethyl being attached to the aryl carbon atom of said phenyl group or the nitrogen atom of said sulfamyl group.

As those antharquinone dyes, for example, the following compounds can be mentioned:

1-amino-4-(2',4',6'-trimethylphenylamino)-anthraquinone-2-sulfonic acid
1-amino-4-(2',4',6'-trimethylphenylamino)-anthraquinone-2,8-disulfonic acid
1-amino-4-(4'-sulfatophenylamino)-5-acetaylamino-anthraquinone-2-sulfonic acid
1-amino-4[3'-(N-phenylsulfamyl)-phenylamino]-anthraquinone-2-sulfonic acid
1-amino-2-bromo-4(4'-methylphenylamino)-anthraquinone
1-amino-2-methyl-4-(4'-methylphenylamino)-anthraquinone
1-isopropylamino-4-(4'-methylphenylamino)-anthraquinone
1-cyclohexylamino-4-[4'-(4''-methylphenoxy)-phenylamino]-anthraquinone
1-cyclohexylamino-4-(4'-ethoxyphenylamino)-anthraquinone
1-cyclohexylamino-4-(2',4',6'-trimethylphenylamino)-anthraquinone-6-sulfonic acid
1-cyclohexylamino-4-[(α-methyl-γ-phenyl) propylamino]-anthraquinone
1,4-bis[(α-isobutyl-γ-phenyl) propylamino]-anthraquinone
1,4-bis[(α-isobutyl-γ-phenyl) propylamino]-5,8-dihydroxyanthraquinone
1,4-bis(2'-benzylcyclohexylamino)-6,7-dichloroanthraquinone
1,4-bis-[1',2',3',4'-tetrahydronaphthyl(2')amino]-anthraquinone
1,4-bis(2',4',6'-trimethylphenylamino)-6,7-dichloroanthraquinone
1,4-bis[4'-(4''-chlorophenoxy)phenylamino]-anthraquinone
1,4-bis(4'-methylphenylamino)-5,8,-dihydroxyanthraquinone
1,8-dihydroxy-5-nitro-4(4'-methylphenylamino)-anthraquinone
1-hydroxy-4-(2',4'-dimethylphenylamino)-anthraquinone
1-amino-2-phenoxy-4-(2',4',6'-trimethylphenylamino)-anthraquinone
1,4-diamino-2,3-bisphenoxyanthraquinone
1,4-diamino-2-phenoxyanthraquinone-3-sulfonic acid
4-(2',4',6'-trimethylphenylamino)-1,9-anthrapyrimidone-2-sulfonic acid
C-benzoyl-4-(2',4',6'-trimethylphenylamino)-1,9-anthrapyridone-2-sulfonic acid
N-methyl-4-(4'-methylphenylamino)-1,9-anthrapyridone-
1-amino-2-phenoxy-4-hydroxyanthraquinone.

On the other hand, as anthraquinone dyes having substitutable hydrogen atoms in their sulfonamide groups, dye bodies used for acid dyes and dispersion dyes can be used, and, for example, the following compounds can be used.

1-amino-4-cyclohexylaminoanthraquinone-2-sulfonamide
1-amino-4-(3'-sulfamylphenylamino)-anthraquinone-2-sulfonic acid
1-cyclohexylamino-4(2',4',6-trimethyl-3'-sulfamylphenylamino)-anthraquinone-6-sulfonic acid 1,4-bis(4'-methyl-2'-sulfamylphenylamino)-
anthraquinone
1,4-bis(2',4',6'-trimethyl-3'-sulfamylphenylamino)-
anthraquinone
1,4-bis[α-methyl-γ-(4'-sulfamylphenyl)-propylamino]-
anthraquinone-6-sulfonic acid
1,4-diamino-2,3-bis(4'-sulfamylphenoxy)-anthraquinone
1,4-diamino-2(4'-sulfamylphenoxy)anthraquinone-3-
sulfonic acid
N-methyl-4(2',4'-disulfamylphenylamino)-1,9-
anthrapyridone Also dyes include mono-, diazo dye or metal-containing azo dye having aryl residue or sulfamyl group with substitutable hydrogen atoms in the diazo or coupling component. As azo dyes, the following compounds, for example, can be mentioned.

2-(4'-methyl-2'-sulfamylphenylazo)-1-naphthol-4-
sulfonic acid
2-(2',4'-dimethylphenylazo)-1-naphthol-6-sulfonic acid
2-(2',4'-dimethylphenylazo)-1-naphthol-3,6-disulfonic
acid
2-(phenylazo)-1-naphthol-8-(β-phenylpropionylamino)-
3,6-disulfonic acid
1-(2'-hydroxyphenylazo)-2-naphthol-6-sulfonamide
1-(2'-sulfamylphenylazo)-2-naphthol-8-sulfonic acid
1-(2',4',6'-trimethylphenylazo)-2-naphthol-3,6-disulfonic
acid
1-(2'-methylphenylazo)-2-naphthol-6,8-disulfonic acid
2-(2',4'-dimethylphenylazo)-1,8-dihydroxynaphthalene-
3,6-disulfonic acid
7-amino-8-(2'-sulfamylphenylazo)-1-naphthol-3-sulfonic
acid
7-acetylamino-8-(2'-methylphenylazo)-1-naphthol-3-
sulfonic acid
7-(2',4',6'-trimethylphenylamino)-2-(2'-nitrophenylazo)-
1-naphthol-3-sulfonic acid
6-acetylamino-5-(2'-methylphenylazo)-1-naphthol-3-
sulfonic acid
8-(4'-methylbenzoylamino)-2-(2'-methylphenylazo)-1-
naphthol-3,6-disulfonic acid
8-acetylamino-2-(2',5'-dimethylphenylazo)-1-naphthol-
3,6-disulfonic acid
8-acetylamino-2-(2'-phenoxyphenylazo)-1-naphthol-
3,5-disulfonic acid
1-(2',5'-dichloro-4'-sulfophenyl)-4-(2'',4''-dimethyl-
phenylazo)-3-methyl-5-pyrazolone As phthalocyanine dyes, for example, those, shown below, of copper, cobalt and nickel can be mentioned.

phthalocyanine-3'-bis(N-phenylsulfonamide)-3'',3'''-
disulfonic acid
phthalocyanine-3,3'-bis-sulfonamide-3'',3'''-disulfonic
acid
phthalocyanine-3-N-methylsulfonamide-3'-sulfonic acid
phthalocyanine-3,3'-bis-sulfonamide-3''-N-phenylsulfon-
amide-3'''-sulfonic acid
phthalocyanine-3,3'-bis-N-(p-sulfamylphenyl)sulfon-
amide-3'',3'''-disulfonic acid
phthalocyanine-4,4'-bis-N-phenylsulfonamide-4'',4'''-
disulfonic acid
4,4'-bisphenyloxy-phthalocyanine
4,4'-bisphenylthio-phthalocyanine
3,3'-bisphenylaminomethylphthalocyanine
3,3'-bisphenylaminomethylphthalocyanine-3''-sulfonic
acid.

In addition, amino-N-phenylnaphthalimidesulfonic acid and rhodamine dye having sulfamyl group, etc. can be used.

As clearly shown above, an organic dye to be used in the present invention has a substitutable hydrogen atom on its aryl nucleus or sulfamyl group, and the introduction of a reactive group shown by the general Formula I through the reaction of organic dye with a reactive compound represented by the above-mentioned general Formula II, or a compound represented by the Formula III or IV and formaldehyde under the reatcion conditions shown below can be brought out through the substitution with the said substitutable hydrogen atom.

Compounds shown by the general Formulas II, III and IV which are used in the present invention are novel compounds synthesized by the present inventors, and can be manufactured advantageously, remarkably with ease, on an industrial scale. That is, when $n$ is zero in the above-mentioned general formula, sulfonic acid chloride of benzonitrile or a derivative thereof is reduced to sulfinic acid, which is subjected to the condensation reaction with ethylene oxide to obtain a compound represented by the general Formula IV, which is hydrolyzed with weakly alkaline hydrogen peroxide to obtain (III), which is further subjected to methylolation with formaldehyde under the weakly alkaline condition to obtain (II). In this case, it is preferable to use m- or p-sulfonic acid chloride of benzonitrile, and, as substituents, methyl, methoxy group and halogen atom can be mentioned.

On the other hand, when $n$ is 1, aminophenyl β-hydroxyethylsulfon or its derivatives are subjected to acylation with cyanobenzene sulfonic acid chloride or cyanobenzene carboxylic acid chloride to obtain a compound represented by the general Formula IV which is hydrolyzed to obtain (III). The compound (III) is further subjected to methylolation with formaldehyde under weakly alkaline conditions to obtain (II). It is preferable to use m- or p-form of cyanobenzenesulfonic acid chloride or cyanobenzene carboxylic acid chloride, the cyanobenzene sulfonic acid chlorides or cyanobenzenecarboxylic acid chlorides having substituents such as methyl, methoxy, chloro group, etc., and, as the derivatives of aminophenyl-β-hydroxyethylsulfon, those having substituents such as methyl, methoxy, chloro-, carboxyl group, etc. are used.

When X is a halogen atom in (II), no matter whether $n$ is 0 or 1, (II) can be easily obtained by reacting (III) with sym.-dichloro or sym.-dibromomethyl ether in sulfuric acid, and in this case the sulfuric acid solution, as it is, can be used in the reaction with the dye body.

The introduction of a reactive group represented by the general Formula I (wherein, Y is β-sulfatoethyl) brought about through the reaction of a reactive compound represented by the general Formula II with the above-mentioned various dyes, can be operated in sulfuric acid, preferably in 80–100% sulfuric acid, using the reactive compound in a molar ratio of 1–3 with respect to the amount of the dye, at a reaction temperature of 0–60° C., preferably at 10–20° C., for 1–20 hours. The completion of the reaction can be observed by the disappearance of the dye body in paper-chromatograph (using a developing agent, for example, a solution of n-butanol, ethanol and water at volume ratio of 3:1:1 respectively).

The reaction product is discharged in ice water after the reaction is completed, and subjected to salting-out in inorganic salts such as NaCl and KCl, with the result that the product is precipitated. Anionic surface active agents may be added to the extent of up to 5 or 6% of the dye and agitated in order to facilitate filtration. When the product is hardly soluble in water, it may be sulfonated with fuming sulfuric acid, after the product is isolated or not.

It is not necessary to use, as a reactive compound, a completely processed compound represented by the general Formula II, however, those which can be changed into such a reactive compound in sulfuric acid under suitable conditions, like (III) or (IV), may also be used.

When (III) or (IV) is used instead of (II), the reaction can be operated by adding formaldehyde, at 1:1 (mol) ratio with respect to the amount of (III) or (IV), in the form of formalin, paraformaldehyde or dihalomethyl ether which is a condensed form thereof with hydrogen halide, to sulfuric acid onto which a compound represented by (III) or (IV) is dissolved at the same time with the above-mentioned dyes. The concentration of sulfuric acid, reaction temperature, reaction period, after-treatment in this case may be completely the same as those with reactive compound (II). The dyes thus obtained may be treated with weak alkali, if necessary, to transform β-sulfatoethyl group into vinyl group with ease.

The present inventors have found that when fibers are dyed with ovel dyes thus obtained nuder suitable dyeing conditions as shown below, the dyes can be strongly adhered onto fibers to give remarkably excellent various fastnesses. The present novel dyes can be produced remarkably with ease on an industrial scale. The present invention, therefore, is of great significance from an industrial point of view.

The fibrous materials to be used in the process of the present invention may include cellulose fiber such as cotton, hemp, viscose, rayon, staple fiber, etc.; nitrogen-containing fiber such as wool, silk, polyamide, etc. Various dyeing processes may be applied, such as a conventional dip dyeing, printing, padding etc.

Dip dyeing of cellulose fiber is conducted by adding an inorganic salt such as sodium chloride, sodium sulfate, etc. into a dyeing bath in the presence of an acid binding agent such as sodium hydrogen carbonate, sodium carbonate, sodium hydroxide, sodium phosphate, etc., at 60–90° C.

Padding dyeing can be effected by padding an aqueous solution containing dye dissolved in water in the presence of urea, treating with a chemical solution comprising acid binding agent such as sodium hydrogen carbonate, sodium carbonate, sodium hydroxide, sodium phosphate, etc., at the same time of as after padding, and subjected to steaming or heat-treatment for a short period.

Printing can be conducted by printing, onto fiber, printing paste which can be obtained by adding dye and the above-mentioned acid binding agent to paste such as alkylcellulose, sodium alginate, etc., followed by steaming or heat-treatment, or printing with printing paste without containing an acid binding agent, followed by the treatment with an acid binding agent and then steaming or heat-treatment.

The dyeing of nitrogen-containing fiber can be conducted in a neutral to weakly acidic dyeing bath by a conventional method, and in this case, a nitrogen-containing nonionic surface active agent or cationic surface active agent may be added as a dyeing agent, and after dyeing the dyeing bath may be subjected to neutralization treatment with a weak alkali such as hexamethylentetramine.

After dyeing, it is preferable to remove dyes, which are not adhered onto fiber, with soaping treatment. Dyed materials thus obtained have remarkably excellent fastness.

The following examples are given to illustrate the present invention. All parts and percents are given by weight.

EXAMPLE 1

4.6 parts of 1-amino-4-(2′,4′,6′-trimethylphenylamino) anthraquinone-2-sodium sulfonate is dissolved into 55 parts of conc. sulfuric acid, 2.6 parts of p-(N-hydroxymethylcarbamoyl) phenyl-β-hydroxyethylsulfon is added thereto, and the resulting mixture is stirred at 10°–15° C. for 5 hours. The reaction solution is poured into 275 parts of ice-water containing 27.5 parts of NaCl, and the precipitated dye is filtered off and then washed with a 15% aqueous NaCl solution until the filtrate is made nearly neutral, to obtain a reddish blue dye represented by the following formula,

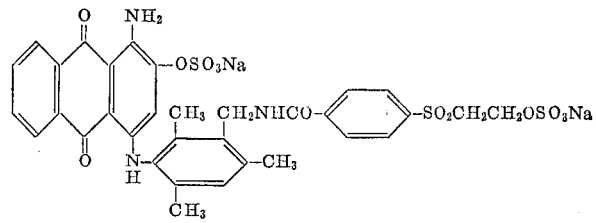

EXAMPLE 2

8.9 parts of copper phthalocyanine-3-disulfonic acid-3-disulfonamide is dissolved into 89 parts of 100% sulfuric acid, and the resulting mixture is cooled to 0° C., and 4.5 parts of p-carbamoylphenyl-β-hydroxyethylsulfon and 1.5 parts of bis-chloromethylether were added thereto for a short period of time, and the mixture is stirred at 10°–15° C. for 20 hours. The reaction solution is poured into 500 parts of an iced 10% aqueous NaCl solution, the precipitate is filtered and washed with a 10% aqueous NaCl solution until the filtrate is made nearly neutral to obtain Turkish blue dye represented by the following formula,

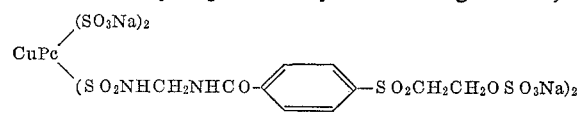

EXAMPLE 3

2.1 parts of p-cyanophenyl-β-hydroxyethylsulfon is dissolved into 20 parts of conc. sulfuric acid, and 0.3 part of paraformaldehyde is added thereto, and the resulting mixture is stirred at 20°–25° C., for 5 hours. The reaction solution thus obtained is added to 25 parts of sulfuric acid solution containing 2.9 parts of 1,4-bis (α-isobutyl-γ-phenyl)-propylamino anthraquinone at a concentration of 90%, and the resulting mixture is reacted at 20°–25° C. for 10 hours. The content is poured into 250 parts of an iced 10% aqueous NaCl solution, and the precipitated substance is filtered off and washed with a 10% aqueous NaCl solution until the filtrate is made nearly neutral. The wet cake thus obtained is dried at a low temperature.

The dried cake is dissolved in 50 parts of 10% fuming sulfuric acid, and the resulting solution is stirred at 10°–15° C. for 2 hours. The solution is poured into 200 parts of an iced 15% aqueous potassium chloride solution to obtain the precipitate which is filtered off. The wet cake thus obtained is suspended in 100 parts of 15% potassium chloride aqueous solution, and the pH of the solution is adjusted to 6–7 with soda ash. Then the solution is subjected to filtration to obtain a clear skyish blue dye represented by the general formula,

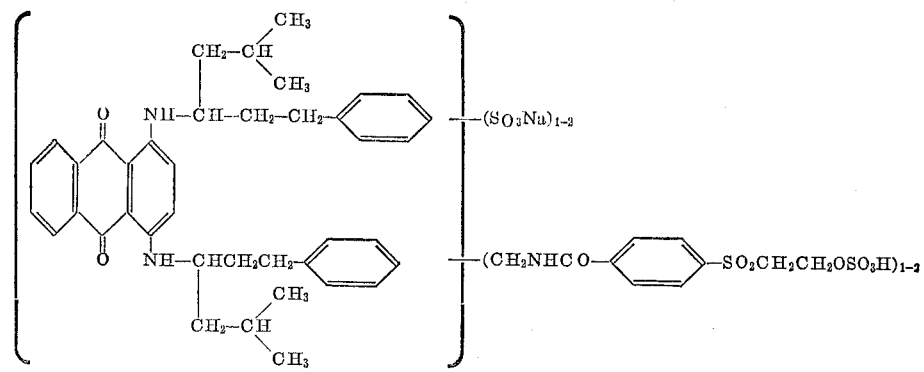

EXAMPLE 4

4.7 parts of 1-amino-4-(3'-sulfamylanilino) anthraquinone-2-sulfonic acid is dissolved in 47 parts of conc. sulfuric acid and 2.6 parts of m-(N-hydroxymethylcarbamoyl)phenyl-β-hydroxyethylsulfon is added thereto, and the resulting mixture is stirred at 10°–15° C. for 10 hours. The reaction solution is poured into 200 parts of ice-water containing 20 parts of sodium chloride, and the precipitate is filtered off. The wet cake thus obtained is suspended in 100 parts of 10% NaCl aqueous solution, and the pH of the solution is adjusted to 8–9 with 45% aqueous sodium hydroxide solution. After the solution is stirred at 50° C. for 1 hour, it is subjected to filtration and then dried to obtain a reddish blue dye, represented by the following formula,

EXAMPLE 5

4.8 parts of 8-acetylamino-2-(2'5'-dimethylphenylazo)-1-naphthol-3,6-disulfonic acid is dissolved into 48 parts of 90% sulfuric acid at a temperature not higher than 10° C., and 4.0 parts of 3-(p-cyanophenylsulfonylamino)-4-methoxyphenyl-β-hydroxyethylsulfon is added thereto, and the resulting mixture is stirred for 2 hours. Further, 0.3 part of paraformaldehyde is added thereto and the mixture is stirred at 10°–15° C. for 3 hours. The reaction solution is poured into 300 parts of ice-water containing 30 parts of sodium chloride. The precipitate is filtered off, and washed with a 10% NaCl aqueous solution until the filtrate is made nearly neutral, to obtain a bluish red dye represented by the following formula,

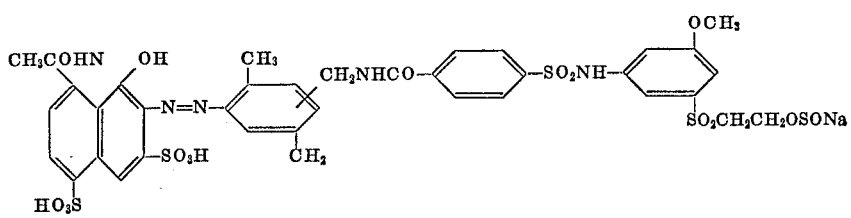

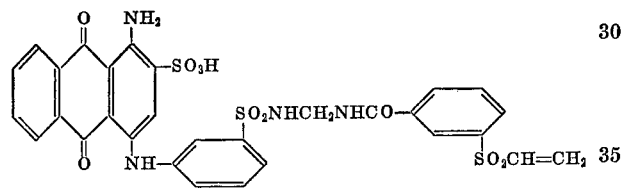

In Table 1, shown below, the structures and color phases of dyes obtained similarly as in the above-mentioned Example 1, are given.

TABLE 1

| Example number | Structure | Color |
|---|---|---|
| 6 | | Bluish red. |
| 7 | | Red. |
| 8 | | Blue. |

TABLE I—Continued

| Example number | Structure | Color |
|---|---|---|
| 9 | NiPc with (SO₃H)₂ and (SO₂NHCH₂NHCO—C₆H₄—SO₂CH₂CH₂OSO₃Na) substituents | Bluish green. |
| 10 | Pyrazolone azo dye: H₃C-pyrazolone-N=N-(2,5-dimethylphenyl)-CH₂NHCO—C₆H₄—SO₂CH₂CH₂OSO₃Na; N-aryl = 2,5-dichloro-4-sulfonatophenyl | Yellow. |
| 11 | Xanthene (rhodamine-type) dye: 3,6-bis(diethylamino)-2,7-dimethylxanthylium with pendant phenyl bearing SO₃Na and SO₂NHCH₂NHCO—C₆H₄—SO₂CH₂CH₂OSO₃Na | Pink. |
| 12 | [Cr complex of two (4-chloro-2-hydroxyphenylazo)-naphthalene ligands bearing SO₂NH₂, linked via —CH₂NHCO—C₆H₄—SO₂NH—C₆H₄—SO₂CH₂CH₂OSO₃Na]⁻ Na⁺ | Purple. |

In the Table 2, shown below, the structures and color phases of dyes obtained similarly as in Example 3 are given.

TABLE 2

| Example Number | Structure | Color |
|---|---|---|
| 13 | 1-amino-4-[(2,6-dimethyl-4-sulfonato-3-(CH₂NHCO—C₆H₄—SO₂CH₂CH₂OSO₃Na)phenyl)amino]-2-(4-sulfonatophenoxy)anthraquinone | Purple. |
| 14 | 1,4-diamino-2-sulfonato-3-[(2-sulfonato-5-(CH₂NHCO—C₆H₄—SO₂CH₂CH₂OSO₃Na)phenoxy)]anthraquinone | Bluish-purple. |

TABLE 2.—(Continued)

| Example Number | | |
|---|---|---|
| 15 | 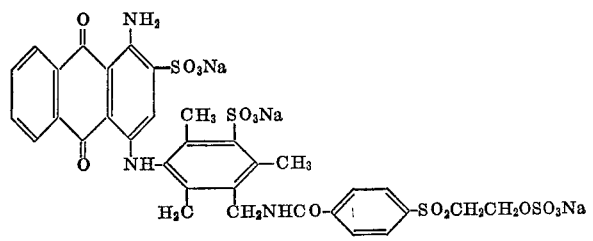 | Greenish-blue. |
| 16 | | Reddish-blue. |
| 17 | | Greenish blue. |

EXAMPLE 18

2 parts of a dye represented by the following structural formula, is dissolved into 500 parts of water, and after the addition of 20 parts of anhydrous sodium sulfate, 20 parts of cotton are dipped therein. The resulting mixture is heated to 70° C. and subjected to dyeing for 1 hour with the addition of 5 parts of sodium phosphate.

After soaping and washing, a dyed material, with clear reddish blue color, which is fast against sunlight and washing, is obtained.

EXAMPLE 19

Cotton cloth is padded with an aqueous solution obtained by dissolving 1 part of a dye represented by the general formula,

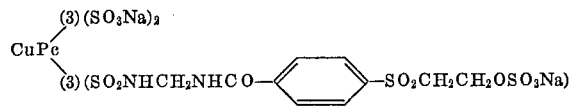

(wherein, CuPc represents copper phthalocyanine) and 5 parts of urea into 50 parts of water. After drying, the cotton cloth is dipped into 100 parts of a chemical solution containing 1 part of sodium hydroxide and 30 parts of sodium chloride, and then the solution is squeezed out. The cloth is then subjected to steaming for 1–2 minutes. After soaping and washing, the dyed substance of clear turquoise blue, which is fast against sun-light and washing, is obtained.

EXAMPLE 20

Cotton cloth is padded with an aqueous solution obtained by dissolving 1 part of a dye represented by the following structural formula

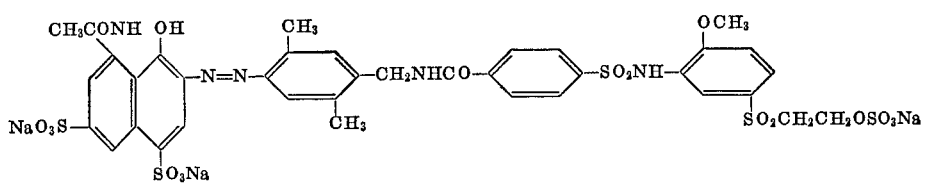

5 parts of urea and 2 parts of sodium hydrogen carbonate into 50 parts of water. After drying, the cotton cloth is heated at 140° C. for 2 minutes. After soaping and water-washing, the dyed substance, with clear bluish red color, which is fast against sun-light and washing, is obtained.

EXAMPLE 21

A solution obtained by dissolving 2 parts of a dye represented by the following structural formula,

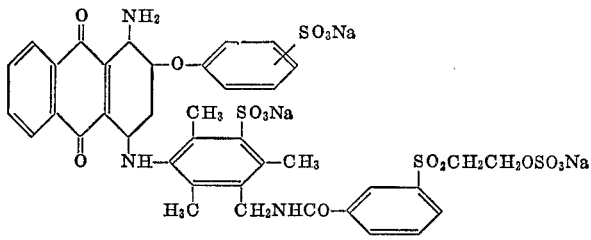

and 8 parts of urea dissolved into 40 parts of hot water is added to 50 parts of 5% sodium alginate paste under stirring. After cooling, 2 parts of sodium hydrogen carbonate is added thereto.

The printing paste is printed onto cotton cloth, and the cotton cloth is subjected to steaming for 5 minutes after drying. After soaping and water-washing, the dyed substance, of clear bluish purple, which is fast against sunlight and washing, is obtained.

EXAMPLE 22

A solution obtained by dissolving 2 parts of a dye represented by the following structural formula,

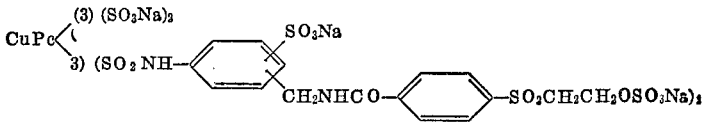

(wherein, CuPc represents copper phthalocyanine) and 8 parts of urea into 40 parts of hot water added to 50 parts of 5% sodium alginate paste to obtain printing paste. The printing paste is printed onto cotton cloth, and then the cotton cloth is dried. The cloth is then dipped into 100 parts of a solution containing 10 parts of sodium chloride, 10 parts of sodium carbonate, 1 part of sodium hydroxide and 1 part of sodium silicate at 95°–100° C. for 30 seconds.

After soaping, and water-washing, the dyed substance, of clear turquoise blue, which is fast against sunlight and washing, is obtained.

EXAMPLE 23

10 parts of wool is dipped into a dye bath (200 parts) containing 0.2 part of a dye represented by the following structural formula,

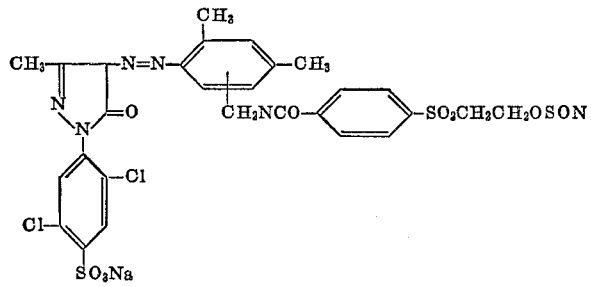

and 0.1 part of acetic acid, 0.1 part of nitrogen containing nonionic surface active agent, and the dye bath is heated to 95°–100° C. and kept at the same temperature for 1 hour.

During this period, 0.1 part of formic acid is added. After soaping and water-washing, the dyed substance, of clear yellow color, which is fast against sunlight and washing, is obtained.

What is claimed is:

1. A reactive dye heating a carbamylmethyl as a reactive group and represented by the formula:

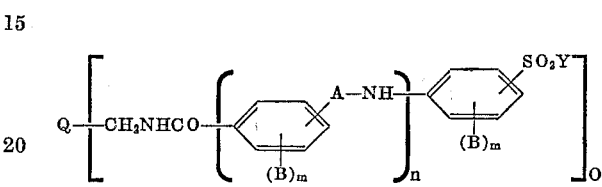

wherein

A is —SO$_2$— or —CO—;
B is methyl, methoxy or chlorine;
Y is β-sulfatoethyl or vinyl;
m and n are 0 or 1;
0 is 1 or 2; and
Q is an anthraquinone residue having the formula:

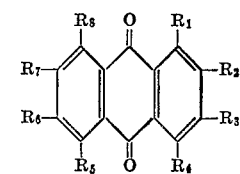

wherein

R$_1$ is hydroxy, amino or a substituted amino;
R$_2$ and R$_3$ are hydrogen, bromine, methyl, sulfamyl, sulfo, phenoxy or 4-sulfamylphenoxy;
R$_4$ is hydroxy, methyl-substituted phenyl, methyl and sulfamyl-substituted phenyl, amino or a substituted amino;
R$_5$ and R$_8$ are hydrogen, hydroxy or sulfo; and
R$_6$ and R$_7$ are hydrogen, chlrine or sulfo, the above substituted aminos being a C$_{1-3}$ alkylamino, (α-C$_{1-3}$-alkyl-γ-phenyl or -4-sulfamylphenyl) propylamino, cyclohexylamino, 2 - benzylcyclohexylamino, 1,2,3,4-tetrahydronaphthylamino, or; a substituted phenylamino where the substituent is methyl, ethoxy, sulfamyl, methyl and sulfanyl, N-phenylsulfamyl, sulfo or methyl- or chloro-substituted phenoxy; the carbamylmethyl being attached to the aryl carbon atom of said phenyl group or the nitrogen atom of said sulfamyl group.

2. A dye according to claim 1 having the formula,
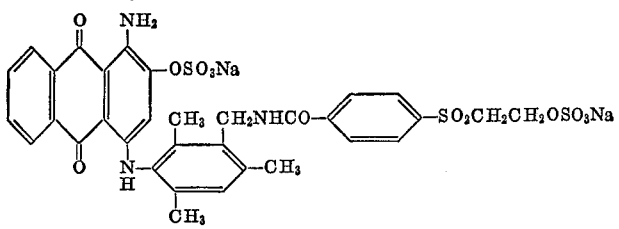
3. A dye according to claim 1 having the formula,
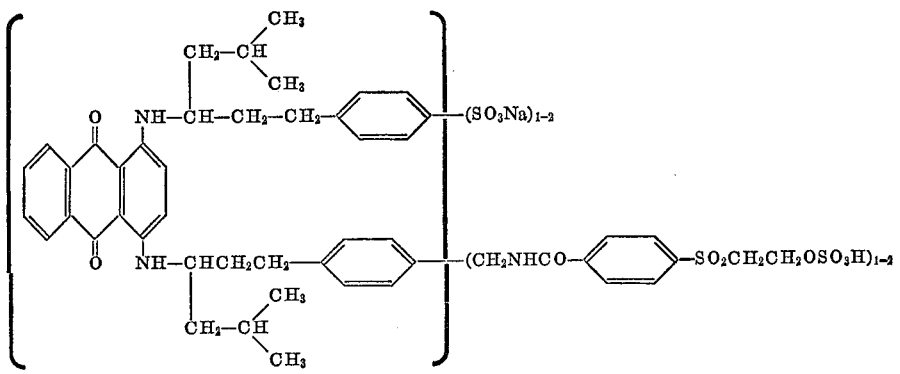
4. A dye according to claim 1 having the formula,
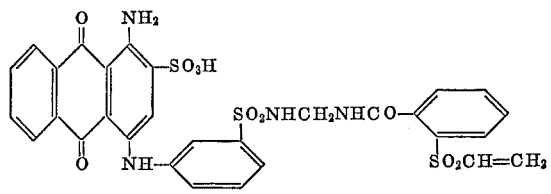
5. A dye according to claim 1 having the formula,
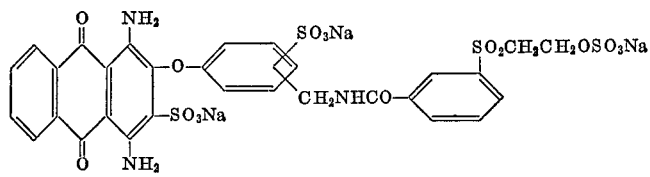
6. A dye according to claim 1 having the formula,
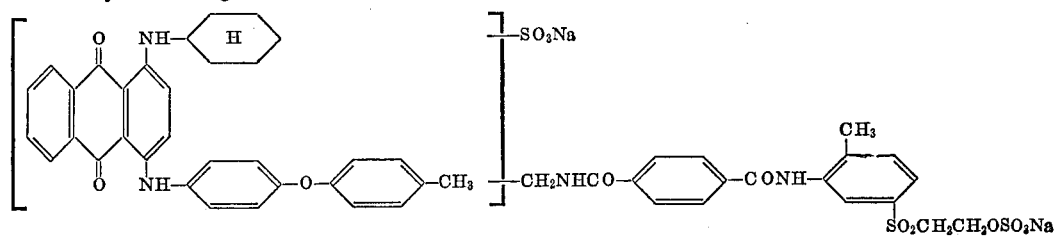
7. A dye according to claim 1 having the formula,
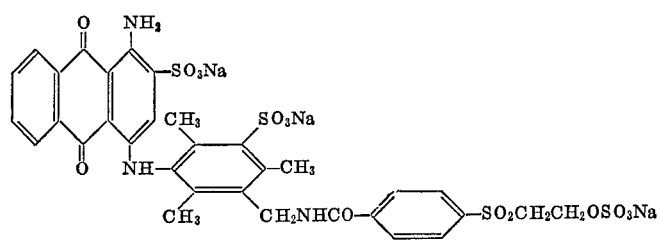

8. A dye according to claim 1 having the formula,

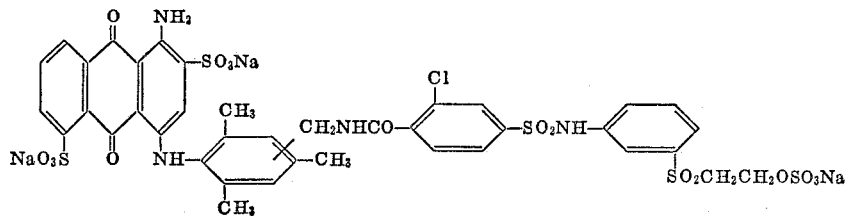

9. A dye according to claim 1 having the formula,

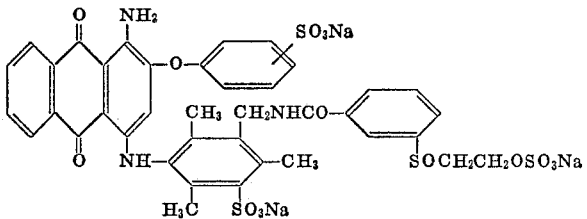

References Cited
UNITED STATES PATENTS

| | | | |
|---|---|---|---|
| 2,784,204 | 3/1957 | Heyna et al. | 260—205 X |
| 3,135,730 | 6/1964 | Heyna et al. | 260—162 X |
| 3,234,207 | 2/1966 | Berner et al. | 260—162 |
| 3,379,715 | 4/1968 | Chiddix et al. | 260—163 |
| 3,414,579 | 12/1968 | Remy | 260—162 X |
| 3,158,597 | 11/1964 | Blass et al. | 260—199 |
| 3,169,124 | 2/1965 | Ischer et al. | 260—199 X |
| 3,247,184 | 4/1966 | Blass et al. | 260—162 |
| 3,320,287 | 5/1967 | Schwander et al. | 260—372 |
| 3,336,147 | 8/1967 | Mitchell et al. | 260—314.5 X |
| 3,376,320 | 4/1968 | Schwander et al. | 260—372 |
| 3,409,633 | 11/1968 | Springer et al. | 260—314.5 |
| 3,419,541 | 12/1968 | Kuhne et al. | 260—162 |
| 3,446,817 | 5/1969 | Harvey et al. | 260—272 UX |
| 3,454,568 | 7/1969 | Fuchs et al. | 260—314.5 X |
| 3,462,463 | 8/1969 | Schwander et al. | 260—372 |

OTHER REFERENCES

Parris et al., J. Org. Chem., vol. 25, pp. 1888–1893 (1960).

FLOYD D. HIGEL, Primary Examiner

U.S. Cl. X.R.

8—41 R, 41 B, 42 R, 42 B, 50, 54.2, 57, 62, 63; 117—138.8 R, 144; 260—151, 162, 198, 199, 200, 261, 278, 314.5, 345.1, 374, 377, 378, 380, 465 D, 465 E, 556 B, 559 T